United States Patent [19]

Watabe et al.

[11] 4,062,825

[45] Dec. 13, 1977

[54] POLYURETHANE COMPOSITION HAVING IMPROVED TEAR STRENGTH AND PROCESS FOR PREPARATION THEREOF

[75] Inventors: Yoji Watabe, Fuchu; Michio Ishii, Murayama; Yutaka Iseda, Tachikawa, all of Japan

[73] Assignee: Bridgestone Tire Company, Ltd., Tokyo, Japan

[21] Appl. No.: 625,248

[22] Filed: Oct. 23, 1975

[30] Foreign Application Priority Data

Oct. 29, 1974 Japan .................................. 49-123961

[51] Int. Cl.² .............................................. C08K 3/36
[52] U.S. Cl. ............................. 260/37 N; 260/40 TN
[58] Field of Search ........... 260/37 N, 77.5 R, 40 TN

[56] References Cited

U.S. PATENT DOCUMENTS

| 3,391,101 | 7/1968 | Kelly et al. | 260/37 N |
|---|---|---|---|
| 3,441,523 | 4/1969 | Dwyer et al. | 260/37 N X |
| 3,585,162 | 6/1971 | Lapp | 260/37 N |
| 3,716,502 | 2/1973 | Loew | 260/37 N X |

Primary Examiner—Sandra M. Person
Attorney, Agent, or Firm—Brooks, Haidt, Haffner & Delahunty

[57] ABSTRACT

A polyurethane composition having high tear strength has been produced by mixing homogeneously 20 to 50 parts by weight of finely divided acidic silica particles, 100 parts by weight of isocyanate-terminated prepolymer and appropriate parts of curative, and curing the mixture in a manner well known in the prior art, where the ratio ($l/d$) of average chain distance ($l$) between adjacent crosslinking points of the cured polyurethane chains to average size ($d$) of finely divided silica particles is in the range of from 2.5 to 20.

16 Claims, No Drawings

POLYURETHANE COMPOSITION HAVING IMPROVED TEAR STRENGTH AND PROCESS FOR PREPARATION THEREOF

BACKGROUND OF THE INVENTION

1. Field of the Invention

This invention relates to polyurethane compositions with high tear strength and the process for preparation thereof. In particular this invention is concerned with improvement of the tear strength of polyurethane composition by incorporation of finely divided acidic silica particles in a predetermined ratio with isocyanate-terminated prepolymer.

2. Description of the Prior Art

The tear strength (hereinafter referred to as Γ) of the prior polyurethane elastomer is mostly in the range of 10 – 50 kg/cm and this level is satisfactory only for the limited applications for which the polyurethane composition has been used.

However, the conventional polyurethane elastomer composition can not be used for severe applications such as for tire tread used on rough roads, cover material for golf balls durable to high impact tear stress, and rubber screen used for sieving crushed stone or ore. Whereas it was difficult to improve further the tear strength of the prior polyurethane elastomer composition which had already advanced to have a comparatively high level of tear strength, the improvement if attained will develop further applicable fields of the polyurethane elastomer composition, including the above mentioned applications. While the incorporation of silica particles so as to improve tear strength is well known in the field of rubber, and plastic, other than polyurethane, it has been understood that the polyurethane composition which has a micro heterogeneous reinforcing structure will result in insufficient effect of the silica incorporation and will results in some drop of mechanical strength.

SUMMARY OF THE INVENTION

According to the present invention, there is provided a polyurethane composition having high tear strength, which comprises 100 parts by weight of prepolymer having terminal isocyanate groups, 20 to 50 parts by weight of finely divided acidic silica with pH ranging from 3 to 7 and appropriate parts of curative, the ratio ($l/d$) of the average distance ($l$) between adjacent crosslinking points of cured polyurethane chains to an average diameter ($d$) of said silica being in the range of from 2.5 to 20. (The "parts" hereinafter is by weight unless otherwise indicated.)

According to one aspect of the present invention, there is provided a process for producing said polyurethane composition having high tear strength which comprises the steps of mixing the prepolymer having terminal isocyanate groups with said finely divided acidic silica under strong shearing force, and curing the mixture to form the composition.

According to a further aspect of the present invention, there is provided a shaped article having improved tear strength which is obtained by casting the composition comprising prepolymer, acidic silica and, curatives and curing under hot pressure.

It is an object of the present invention to provide a polyurethane composition having high tear strength. A polyurethane composition of the present invention has a tear energy of from about 100 to 300 kg/cm, which level can never be attained in the case of the conventional polyurethane composition.

It is another aspect of the present invention to provide a tear-proof polyurethane composition having good elasticity and excellent physical properties.

DESCRIPTION OF THE PREFERRED EMBODIMENTS

The polyurethane polymer of the present invention comprises proportionally 100 parts of isocyanate-terminated prepolymer, 20 to 50 parts of finely divided acidic silica particles and appropriate parts of curative, the prepolymer having a number average molecular weight of 1,000 to 5,000, the silica particles having pH of 3 to 7 and the ratio ($l/d$) of average distance ($l$) between adjacent crosslinking points of the cured polyurethane chains to average size ($d$) of the silica particles ranging from 2.5 to 20.

The prepolymer usable in the present invention comprises at least one species selected from the group consisting of polyether, polyester and polyunsaturated hydrocarbon, and having isocyanate groups at the terminal end of the chain. The prepolymer to be used in this invention may be prepared by the conventional methods, for example, by reacting isocyanate compound with at least one member selected from the group consisting of polyether, polyester, copolymer of polyether and polyester, diene polymer and the mixture thereof, which has active terminal hydrogen. The active terminal hydrogen means terminal hydroxy, terminal thiol, terminal amino, terminal imino or terminal carboxyl radicals. The number average molecular weight of the prepolymer ranges from 1,000 to 5,000, preferably 1,500 to 4,000, and has a functionality of 1 – 3, preferably 2.

The above mentioned polyether, polyester and polydiene polymers having active terminal hydrogen include chain-extended reaction products of polyfunctional isocyanate compound such as diisocyanate compounds with these polymers of lower molecular weight, and chain-extended products obtained by reacting a polyether, polyester or polydiene chain terminated with isocyanate compound, and further reacting with polyether, polyester or polydiene having terminal active hydrogen.

There may be mentioned as follows, for embodiments of the polyethers, polyesters and polydienes usable in this invention:

As the representative polyether having at least one active hydrogen at its chain terminals, there may be mentioned a polyalkylene oxide such as polyethylene oxide, polypropylene oxide, polybutylene oxide, polyamylene oxide and the derivatives thereof; a polyepihalohydrin such as polyepichlorohydrin and the like; a polystyrene oxide; a polyhydric polyalkylene ether such as polyoxytetramethylene glycol and the like; a polyacetal produced by the condensation of butanedioxyethyl glycol or diethylene glycol with formaldehyde; a polyoxyalkylene triol such as polyoxypropylene triol and the like; a polyoxyalkylene dicarboxylic acid, a polyoxyalkylene dithiol, a polyoxyalkylene diamine and a polymer polyol produced by chain extending a polyether as described above with a diisocyanate compound.

Among these, a polyhydric polyalkylene ether is preferable and polyoxytetramethylene glycol, polyoxypropylene glycol or its chain pre-extended product are particularly preferable.

As polyesters having terminal active hydrogen, there may be used hydroxypolyesters obtained by reacting polybasic carboxylic acids such as oxalic acid, malonic acid, succinic acid, glutaric acid, adipic acid, pimeric acid, cork acid, azelaic acid, sebacic acid, brassylic acid, fumaric acid, glutamic acid, α-hydromuconic acid, β-hydromuconic acid, α-butyl-α ethylglutaric acid, α,β,-diethyl succinic acid, phthalic acid, isophthalic acid, terephthalic acid, 1,4-cyclohexane dicarboxylic acid, 1,3,5-benzene tricarboxylic acid and their analogues with polyols such as ethylene glycol, propylene glycol, propane-1,2-diol, propane-1,3-diol, allyloxy propane diol, butane-1,4-diol, butane-1,3-diol, butane-2,3-diol, butane-2,4-diol, butanedioxyethyl glycol, butane-1,4-diol, butyne-1,4-diol, pentane-1,4-diol, pentane-1,5-diol, hexane-1,6-diol, decane-1,10-diol, dodecane-1,12-diol, octadecane-7,18-diol, 4,4'-dihydroxy dicyclohexyl methane, 4,4'-dihydroxy dicyclohexyl dimethyl methane, bis-2-hydroxyethyl terephthalate, xylylene glycol, glycerine, castor oil, trimethylol propane, hexane-1,2,6-triol, hexane-1,3,6-triol, pentaerythritol, sorbitol, mannitol, sugar, hydroquinone, 4,4'-dihydroxy diphenyl methane, 4,4'-dihydroxy diphenyl dimethyl methane, resorcinol, thiodiglycol and a glycol of the formula

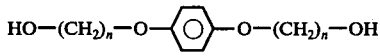

wherein $n$ is 1 – 4, and their analogues and mixtures.

Preferably there are used dihydroxypolyethylene adipate and dihydroxypoly(ethylene glycol/propylene glycol) adipate.

The hydroxy polyester includes polyhydroxy polyesteramide obtained by adding an organic amine such as ethylenediamine, propylene diamine, ethanolamine and their analogues, or a aminoalcohol to the above mentioned components. Moreover, polyesterether glycol such as hydroxypolyester, polydiethylene adipate and the like of the lactone series and lactone copolymer series may be used.

A a polyunsaturated hydrocardon having at least one terminal active hydrogen, there may be used the glycols of the polymers selected from the class consisting of a. homopolymers or copolymers of conjugated dienes having from 4 to 6 carbon atoms, such as polybutadiene, polyisoprene, polychloroprene, polypiperylene, butadieneisoprene copolymer b. copolymers of conjugated diene described above with vinyl substituted aromatic hydrocarbon, such as, butadienestyrene copolymer, isoprene-styrene copolymer, butadienevinylnaphthalene copolymer, butadiene-α-methylstyrene copolymer and c. copolymers of conjugated diene described above with vinyl nitrile monomers, such as butadiene-acrylonitrile copolymer, isoprene-acrylonitrile copolymer, butadiene-α-or β-methyl acrylonitrile copolymer.

Preferably there are used polybutadiene glycol, butadiene-styrene copolymer glycol or butadiene-acrylonitrile copolymer glycol.

As organic isocyanates to react with the above described compounds having active hydrogen, there may be used aliphatic diisocyanates such as ethane diisocyanate, propane diisocyanate, butene diisocyanate, butane diisocyanate, pentane diisocyanate, β-methylbutane diisocyanate, hexane diisocyanate, ω, ω'-dipropylether diisocyanate, heptane diisocyanate, 2,2-dimethyl pentane diisocyanate, 3-methoxy hexane diisocyanate, octane diisocyanate, 2,2,4-trimethyl pentane diisocyanate, nonane diisocyanate, decane diisocyanate, 3-butoxy hexane diisocyanate, 1,4-butylene glycol dipropyl ether-ω, ω'-diisocyanate, undecane diisocyanate, dodecane diisocyanate, dimer acid diisocyanate, trans vinylene diisocyanate, lysine diisocyanate methyl ester, 1,3- and 1,4- xylene diisocyanate, trimethyl hexamethylene diisocyanate, ω, ω'-diisocyanate-1,4-diethyl benzene, ω, ω'-diisocyanate-1,4-dimethyl naphthalene, ω, ω'-diisocyanate-1,5-dimethyl naphthalene, ω, ω'-diisocyanate-n-propylbiphenyl and their mixtures, alicyclic diisocyanates such as ω, ω'-diisocyanate-1,2-dimethylcyclohexane, 1-methylcyclohexane-2,4-diisocyanate, decaline-1,5-diisocyanate, ω, ω'-diisocyanate-1,4-dimethylcyclohexane, 1-ω-methyl isocyanate-2-ω-n-propyl isocyanate-3,5-dimethylcyclohexane, 1,3- and 1,4-cyclohexyl diisocyanate, methylene-bis-(4-cyclohexyl isocyanate), isophorone diisocyanate and their mixtures, aromatic diisocyanates such as tolylene-2,4-diisocyanate, tolylene-2,6-diisocyanate, tolylene-2,5-diisocyanate, tolylene-3,5-diisocyanate, toluidine diisocyanate, 1,3-dimethyl benzene-2,4-diisocyanate, 1,3-dimethyl benzene-4,6-diisocyanate, 1,4-dimethylbenzene-2,5-diisocyanate, 1-ethylbenzene-2,4-diisocyanate, 1-isopropylbenzene-2,4-diisocyanate, diethylbenzene diisocyanate, diisopropylbenzene diisocyanate, metaphenylene diisocyanate, paraphenylene diisocyanate, 1,4-, 1,5-, 2,6- and 2,7-naphthalene diisocyanate, 1,1'-dinaphthyl-2,2'-diisocyanate, 2,4'- and 4,4'-biphenyl diisocyanate, diphenyl methane-4,4'-diisocyanate, diphenyl dimethyl methane-4,4'-diisocyanate, cyclohexyldi(4-isocyanatophenyl)methane, 3,3'- and 4,4'-benzophenone diisocyanate, α,β-diphenylethane-2,4-diisocyanate, 3-nitro triphenyl methane-4,4'-diisocyanate, 4-nitro triphenyl methane-4,4'-diisocyanate, diphenyl ether-4,4'-diisocyanate, diphenyl sulfide-4,4'-diisocyanate, stilbene-4,4'-diisocyanate, dibenzyl-4,4'-diisocyanate, diphenyl isopropylidene-4,4'-diisocyanate and alkyl, alkoxy, halogen or nitro substituted derivatives thereof such as 3,3'-dimethyl biphenyl-4,4'-diisocyanate, 3,3'-dimethoxy biphenyl-4,4'-diisocyanate, 2-nitro biphenyl-4,4'-diisocyanate, dichloro biphenyl-4,4'-diisocyanate, 3,3'-dimethyl diphenyl methane-4,4'-diisocyanate, 2,5,2',5'-tetramethyl diphenyl methane-4,4'-diisocyanate, 3,3'-dimethoxy diphenyl methane-4,4'-diisocyanate, 4,4'-dimethoxy phenyl methane-3,3'-diisocyanate, 4,4'-diethoxy diphenyl methane-3,3'-diisocyanate, 2,2'-dimethyl-5,5'-dimethoxy diphenyl methane-4,4'-diisocyanate, 3,3'-dichloro diphenyl dimethyl methane-4,4'-diisocyanate, 3,3'-dichloro diphenyl methane-4,4'-diisocyanate and their mixtures. Among them, tolylene-2,4-diisocyanate, tolylene-2,6-diisocyanate, 1,5-naphthalene diisocyanate, diphenyl-4,4'-diisocyanate, 3,3'-dimethyl biphenyl-4,4'-diisocyanate, diphenylmethane-4,4'-diisocyanate, hexane diisocyanate, cyclohexyl-1,3- and 1,4-diisocyanate, methylene bis(4-cyclohexyl isocyanate), 1,3- and 1,4-xylene diisocyanate, 1-methylcyclohexane-2,4-diisocyanate, decaline-1,5-diisocyanate, toluidine diisocyanate and their mixtures are preferable.

As a curative usable for the present invention, there may be a compound selected from polyamines and polyols.

As the polyamine, there may be used 4,4'-methylene bis(2-chloroaniline), methylene dianiline, methylene bis-2-methoxyaniline, 2,2',5-trichloro-4,4'-methylene diamine, o-phenylene diamine, m-phenylene diamine, p-phenylene diamine, 2,6-dichloro-p-phenylene diamine, tolylene-2,4-diamine, toluidine, dianisidine, diphenylether-4,4'-diamine, 4,4'-diphenyl diamino sulfone, 3,3'-diphenyl diamino sulfone, naphthalene-1,5-diamine, aromatic diamines represented by the formula,

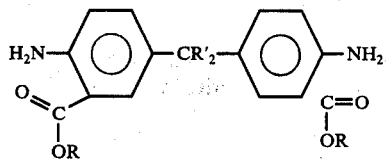

wherein R represents a radical selected from the class of —CH₃, —C₂H₅, C₃H₇, —C₄H₉, C₆H₁₃, —C₈H₁₇,

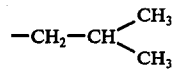

and —CH(CH₃)—(CH₂)₃—CH₃ and R' represents a radical selected from the group of —H, —CH₃, —CH₃, —C₄H₉ and —C₆H₁₃, aromatic diamines represented by the formula,

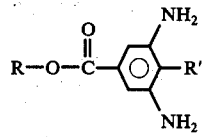

wherein R represents a radical selected from the group of —CH₃, —C₂H₅, —C₃H₇, —nC₄H₉, —iso—C₄H₉, —(CH₂)₂—OCH₃,

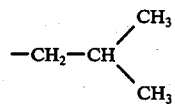

—C₁₈H₃₇ and —CH₂—CH(C₂H₅)—(CH₂)₃—CH₃ and R' represents a radical selected from the group of —CH₃, —C₂H₅, —C₃H₇, —iso—C₄H₉' and halogen, and aromatic diamines such as 2,4-diamino cumene, m-tolylene diamine, p-chloro-o-phenylene diamine, o-chloro-p-phenylene diamine, and their analogues and mixtures and aliphatic polyamine such as hydrazine, ethylene diamine, trimethylene diamine, piperazine diethylene triamine, hexamethylene-1,6-diamine, propylene diamine and their mixtures. As the polyol, there may be used ethylene glycol, propylene glycol, propane-1,2-diol, propane-1,3-diol, allyloxypropane-diol, butane-1,4-diol, butane-1,3-diol, butane-2,3-diol, butane-2,4-diol, butane dioxyethyl glycol, butene-1,4-diol, butyne-1,4-diol, pentane-1,4-diol, pentane-1,5-diol, hexane-1,6-diol, decane-1,10-diol, dodecane-1,12-diol, octadecane-7,18-diol, 4,4'-dihydroxy dicyclohexyl methane, 4,4'-dihydroxy dicyclohexyl dimethyl methane, bis-2-hydroxyethyl terephthalate, xylylene glycol, hydroquinone, 4,4'-dihydroxy diphenylmethane, 4,4'-dihydroxy diphenyl dimethyl methane, resorcinol, thiodiglycol, glycol represented by the formula,

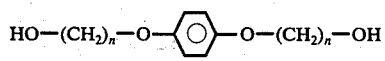

wherein n is from 1 to 4, their analogues and mixtures. Among them, methylene bis(2-chloroaniline), methylene dianiline, naphthalene-1,5-diamine, phenylene diamine, tolylene-2,4-diamine, diphenylether-4,4'-diamine, hydrazine, ethylene diamine, 2,6-dichlorophenylene diamine, hexamethylene-1,6-diamine, piperazine compounds represented by the formulae,

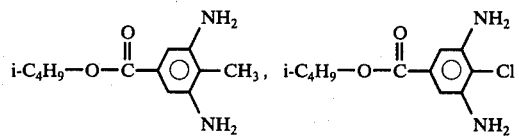

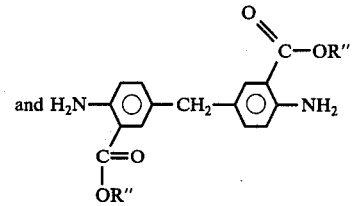

wherein R'' is a radical selected from the group of —CH₃, —C₂H₅, —C₃H₇ and —C₄H₉, ethylene glycol, 1,3-propylene glycol, 1,4-butane diol, a compound represented by the formula,

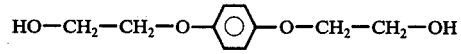

and their mixtures are preferable.

The curative selected from the class of the aromatic polyamine and the aromatic polyol are particularly preferable.

The finely divided acidic silica particles to be used in the present invention have pH values of from 3 to 7, preferably from 3 to 5, wherein the acidity is measured in 4% aqueous suspension.

There are conventionally used various kinds of alkaline silica particles. But these silica particles are not applicable in this invention. The reason therefor is that alkaline silica particles cause side reactions such as dimerization and trimerization of isocyanate, and therefore depress the normal chain extending reaction, and decrease the mechanical properties of the product.

Acidic silica particles with a pH of from 3 to 7 are preferable. The silica particles with pH less than 3 are also applicable, but it is apt to retard the curing reaction.

The acidic silica particles usable for this invention may be prepared by drying processes such as by means of hydrolysis of silicon tetrachloride in an oxyhydrogen flame. The average size of thus prepared silica particles is ordinarily from about 1 to 50 μ. It is important to dry completely the acidic silica particles such as under heating or/and reduced pressure before applying to the prepolymer, in order to prevent consumption of isocyanate groups with humidity absorbed on the silica particles surface.

The important point of this invention is that the average size (d) of silica particles to be incorporated is set as $2.5 \leq l/d \leq 20$ wherein $l$ is the average distance between adjacent crosslinking points of the cured polyurethane chains. The average distance ($l$) can be controlled in accordance with the desired hardness of the polyurethane composition by selecting the following factors;

1. the number average molecular weight of the prepolymer used, 2. the types of prepolymer used and the chain extending material used and (3) the incorporation of various plasticizers.

The molecular weight of the prepolymer can be varied by varying the number average molecular weight of polyether, polyester or polydiene used for the reaction with isocyanate group, from 1,000 to 5,000. The factors (2) and (3) can be combined with the factor (1) so as to obtain suitable number average molecular weight of the prepolymer.

The remarkable improvement of the tear strength can be produced by setting $2.5 \leq l/d \leq 20$ wherein $l$ is the average distance between adjacent crosslinking points along the cured polyurethane chains and d is the average size of silica particles used, by controlling the average distance and selecting the types of acidic silica particles used. When the ratio of $l/d$ is less than 2.5, the tear strength is somewhat improved, but not so remarkably. When the ratio of $l/d$ is more than 20, it is not practical. The ratio of $l/d$ should be from 2.5 to 20, preferably from 7 to 15.

Further, the important point is that the amount of silica particles having the above-prescribed size to be incorporated in the polyurethane composition ranges from 20 - 50 parts by weight per 100 parts by weight of the prepolymer used. When the above-mentioned amount is less than 20 parts, the tear strength is not sufficiently improved. When the amount is more than 50 parts, the other mechanical properties are reduced.

The wording "100 parts by weight of the prepolymer" means that the total amount of polyfunctional polymer having active hydrogen and polyisocyanate is 100 parts by weight, where the polymer having terminal active hydrogen reacts with polyisocyanate.

Silica particles may be mixed with prepolymer before a curative is mixed with prepolymer, or they may be mixed under kneading with the prepolymer after the curative is mixed with the prepolymer. The latter process is preferable because the mixture becomes homogeneous and intimate. It is essential that silica particles should be dispersed homogeneously in the polymer. In order to attain the high tear strength, apparatus capable of kneading with high shearing force should be used, such as, paint mill, RAPLA mixer (developed by Rubber and Plastics Research Association of Great Britain), dual roll, Brabender and Banbury Mixers. Paint Mills are preferable. While it is possible to mix homogeneously with a laboratory mixer having two blades, the dispersion obtained is insufficient so that the resultant tear strength will be about a half of that resulting from the above-mentioned preferable apparatus.

The polyurethane composition of this invention can be used for many kinds of articles, which need high tear strength and mechanical strength.

The average distance between adjacent crosslinking points of the cured polyurethane chains is determined by the following two-step calculation based on the value to be measured. The $l$ can be measured by using polyoxytetramethylene glycol as follows. The first step is that the density of crosslinking network points $\nu CHCl_3$ is measured with a Reticulometer made by Wallace Inc. in Britain, by using chloroform as a swelling solvent, in accordance with Cluff's method [see, Journal of Polymer Science, Vol. XLV. pages 341 – 345, 1960 by E. F. Cluff et al]. The molecular weight existing between adjacent crosslinking points $M_p$ is given by the following equation.

$$M_p = \rho/\nu CHCl_3$$

wherein $\mu$ is the density of polyurethane. The second step is that assuming that the length of oxytetramethylene glycol monomer (molecular weight =72) is 7.4 Å, the $l$ is calculated by the following equation;

$$l = (M_p / 72) \times 7.4$$

The $l$ is calculated for silica unicorporated polyurethane composition, and the ratio for $l/d$ is calculated with assuming that the $l$ as calculated above is the same to that of the silicaincorporated polyurethane composition.

The average size of silica particles is determined statistically by measuring electron microscope photographs.

The mechanical properties data are obtained by Tensilon Tester UTM-Type 1 (trade name, for tester, manufactured by Toyo Baldwin Co., Ltd.), with a rate of 5cm/mm. The data obtained includes Young's modulus ($E_{10}$) which measures 10 times the 10% modulus, tensile strength ($T_B$), elongation ($E_B$) at breakdown, tear strength (   )and stress concentration factor ($m\gamma$). The more $T_B, E_B$ and      are, the better the composition is. The less $m\gamma$ is, the better it is.

The tear strength is measured by using a specimen of 10mm in width, 2mm in thickness and 100mm in length having a cut of 2mm wide at its center of width dimension and holding the specimen at an interval of 40mm between two cheeks with the cut positionedat the center of the interval. The measurement is carried out according to Agei's method. (Refer to K. Agei, K. Ninomiya, Journal of the Society of Rubber Industry Japan 41 116, 1968)

Young's modulus of the prior rubber composition reinforced with fillers such as silica particles is commonly increased with the increase of incorporated fillers present. By contrast, the Young's Modulus of the polyurethane composition of this invention is not so much changed regardless of the remarkable increase of tear strength resulting in good elasticity.

The polyurethane composition of the present invention is useful in many fields, particularly for a tire tread, a solid tire, a rice roll, a roller for conveyor belt, a V-belt, a lining a sleeve hose, a cover a golf ball, a rubber screen, a dock fender, a bumper, a shoe sole, a traction drive belt and so on.

The following examples illustrate further in detail the invention and are not to be construed as a limitation of the scope of the invention.

The parts, ratios and percents are represented by weight unless otherwise indicated.

PRELIMINARY EXPERIMENT

The mixture of 100 parts of dehydrated polyoxytetramethylene glycol (OH value; 106.9) and 33.7 parts of tolylene 2,4-diisocyanate was reacted at 80° C for 8 hrs under stirring.

The isocyanate content of the prepolymer obtained was 6.02%. (hereinafter referred to as prepolymer A)

In the similar manner, three species of polyoxytetramethylene glycol having different number average molecular weight more than that of the above prepolymer (OH values of the polymers were 66.3, 42.6 and 33.8 respectively) were subjected to reaction with tolylene-2,4-diisocyanate at the weight ratio of 21.1, 13.7 and 11.0 parts respectively per 100 parts of said glycols respectively, to prepare three kinds of prepolymers having 4.12%, 2.82% and 2.30% of isocyanate content respectively (hereinafter each referred to as prepolymer B, C and D).

EXAMPLE 1

To 100 parts of prepolymer B kept at 70° C, added 4,4'-methylene bis (2-chloroaniline) which was melted at 120° C was at the equivalent ratio of amino group to isocyanate group of 1.0 and then the mixture was displaced on a paint mill immediately after stirring thoroughly.

Then, 40 parts of acidic silica particles having an average size of 160 A which was previously dehydrated at 180° C under reduced pressure at 4mm Hg were added to the resultant mixture and kneaded thoroughly in the paint mill. The kneaded compound placed in an iron slab mould which was previously heated at 100° C was cured at 100° C for 3 hrs under pressure of an electric heat presser.

The physical properties measured on the resulting elastomeric composition are shown in Table 1.

The discussion about the results obtained will be after the results of Examples 2 – 6 and Comparative Examples.

EXAMPLE 2 – 5 and COMPARATIVE EXAMPLE 1 – 6

According to the procedure of Example 1, six samples of elastomeric compositions (referred to as Examples 2 – 5 and Comparative Examples 1 – 2), were obtained by using 4 species of prepolymer A, B, C and D in combination with 3 species of fine divided acidic silica.

The average sizes of these three species of silica particles herein used were 80 A (Aerosil 300, pH: 3.6 – 4.3 produced by Japan Aerosil Co. Ltd.), 160 A (Aerosil 200, pH: 3.6 – 4.3 produced by Japan Aerosil Co. Ltd.) and 400 A (Aerosil OX 50, pH: 3.6 – 4.3 produced by Japan Aerosil Co. Ltd.) and the amount of the incorporated silica particles was 40 parts per 100 parts of the prepolymer used.

Further, the elastomeric compositions were prepared in a similar manner as described in Example 1, except that an acidic silica was not used (Comparative Examples 3 – 6).

The physical properties of these compositions are shown in Table 1. From the results obtained in Comparative Examples 3 – 6, it is apparent that the tear strength of the polyurethane elastomer not-reinforced with silica particles was about 50 kg/cm at maximum.

On the contrary, the elastomeric compositions produced according to the present invention show excellently high levels of 100 – 300 kg/cm. It is to be noted that the improved result is unexpectedly remarkable and significant.

It is to be noted that the improvement of tear strength of the polyurethane composition is not dependent only upon the distance ($l$) or the size ($d$), and it depends upon the ratio of $l/d$ which should range from 2.5 to 20. The ratio preferably is from 7 to 15.

EXAMPLE 6 and COMPARATIVE EXAMPLE 7 – 9

The four species of polyurethane compositions were produced according to the procedure of Example 1 except using 5 parts, 10 parts, 20 parts or 60 parts of the silica particles having average size of 160 A instead of 40 parts of said silica respectively. The ratio of ($l/c$) was 7.2 for each species.

The results in comparison with Example 3 and Comparative Example 5, are shown in Table 2. It is to be noted that the tear strength is not so much improved when the amount of silica particles is less than 20 parts per 100 parts of the prepolymer, and it is markedly improved when the silica particles amount is 20 parts or more than 20 parts per 100 parts of the prepolymer. The tear strength reaches a maximum when the silica amount is about 40 parts. When the silica amount is more than 60 parts, the tear strength tends to be lower and further the tensile strength ($T_B$) is reduced.

In view of the above consideration, it is concluded that the amount of silica particles to be incorporated should range from 20 to 50 parts per 100 parts of the prepolymer so as to attain high tear strength of the polyurethane composition, such as above 100kg/cm, with sufficiently high tensile strength. Preferably the silica particles amount to be incorporated with the prepolymer is from 25 to 45 parts per 100 parts of the prepolymer.

The significant advantage of this invention is that Young's modulus ($E_{10}$) is restrained below the value calculated from Guth-Gold's equation [ Refer to "Gomu no Seishitsu to Kako (Properties and workabilities of rubber)" published by the Society of Polymer Science, Japan ], whereas the marked reinforcement is obtained in the silica-incorporated elastic composition. For example, the composition of 100 parts of 1,4-cis polybutadience reinforced with 50 parts of carbon black SAF indicates three times the value of Young's modulus ($E_{10}$) of the base material, which is markedly higher than the value calculated from Guth-Gold's equation, that is two times the value of Young's modulus of the base material.

Table 1

| Examples Comparative Examples | | The kinds of Prepolymer | $lo$ (A) | $d$ (A) | $lo/d$ | $\Gamma$ (kg/cm) | $m\Delta$ (l/cm) | $E_{10}$ (kg/cm$^2$) | $T_B$ (kg/cm$^2$) | $E_B$ (%) |
|---|---|---|---|---|---|---|---|---|---|---|
| Comparative Example | 1 | A | 124 | 400 | 0.31 | 42 | 37 | 600 | 503 | 455 |
| " | 2 | B | 393 | 400 | 0.98 | 48 | 20 | 348 | 351 | 580 |
| Example | 1 | B | " | 160 | 2.5 | 88 | 13 | 485 | 376 | 568 |
| " | 2 | C | 1150 | 400 | 2.9 | 115 | 0.8 | 211 | 298 | 660 |
| " | 3 | C | " | 160 | 7.2 | 239 | 0.7 | 268 | 290 | 860 |
| " | 4 | C | " | 80 | 14 | 292 | 0.3 | 250 | 284 | 820 |
| " | 5 | D | 3230 | 160 | 20 | 74 | 0.3 | 43 | 100 | 908 |
| Comparative Example | 3 | A | 124 | — | — | 33 | 41 | 576 | 604 | 420 |
| " | 4 | B | 393 | — | — | 41 | 32 | 337 | 415 | 570 |
| " | 5 | C | 1150 | — | ' | 44 | 15 | 191 | 352 | 670 |
| " | 6 | D | 3230 | — | — | '6 | 24 | 18 | 66 | 838 |

Table 2

| Examples or Comparative Examples | | The amount of Silica(parts) | Γ (kg/cm) | mΔ (l/cm) | $E_{10}$ observed (kg/cm) | The ratio of the observed $E_{10}$ to the anticipated value | $T_B$ (kg/cm²) | $E_b$ (%) |
|---|---|---|---|---|---|---|---|---|
| Comparative Example | 5 | 0 | 44 | 15 | 191 | | 352 | 670 |
| " | 7 | 5 | 50 | 14 | 204 | | 355 | 680 |
| " | 8 | 10 | 33 | 20 | 196 | | 354 | 660 |
| Example | 6 | 20 | 167 | 0.5 | 185 | 0.74 | 330 | 690 |
| " | 3 | 40 | 239 | 0.7 | 268 | 0.82 | 290 | 860 |
| Comparative Example | 9 | 60 | 124 | 1 | 381 | | 160 | 710 |

We claim:

1. A polyurethane composition for the preparation of articles having a high tear strength, comprising proportionally 100 parts by weight of prepolymer having terminal isocyanate groups, 20 to 50 parts by weight of finely divided acidic silica particles having a pH value of from 3 to 7 and appropriate parts of curative, the number average molecular weight of said prepolymer ranging from 1,000 to 5,000, the ratio ($l/d$) being such that the average distance ($l$) between adjacent crosslinking points of the cured polyurethane chains to average size ($d$) of the acidic silica particles ranges from 2.5 to 20.

2. A polyurethane composition according to claim 1, wherein said ratio ($l/d$) of average distance ($l$) between adjacent crosslinking points of the cured polyurethane chains to the average size ($d$) of the acidic silica particles ranges from 7 to 15.

3. A polyurethane composition according to claim 1, wherein pH value of the acidic silica particles ranges from 3 to 5.

4. A polyurethane composition according to claim 1, wherein the amount of the acidic silica particles per 100 parts be weight of the prepolymer ranges from 25 to 45 parts.

5. A polyurethane composition according to claim 1, wherein the prepolymer has terminal isocyanate groups and comprises at least one species selected from the group consisting of polyether, polyester and polyunsaturated hydrocarbon.

6. A polyurethane composition according to claim 1, wherein the prepolymer is prepared by reacting an organic polyisocyanate with at least one species selected from the group consisting of polyether, polyol, polyester polyol, polydiene polyol, and the mixture thereof.

7. A polyurethane composition according to claim 6, wherein material for reaction with the polyisocyanate is at least one species selected from the group consisting of polyoxypropylene glycol and polyoxytetramethylene glycol.

8. A polyurethane composition according to claim 5, wherein material for reaction with the polyisocyanate is at least one species selected from the group consisting of dihydroxypolyethylene adipate and dihydroxypoly (ethylene glycol / propylene glycol) adipate.

9. A polyurethane composition according to claim 6, wherein material for reaction with the polyisocyanate is at least one species selected from the group consisting of polybutadiene glycol and butadiene-styrene copolymer glycol.

10. A polyurethane composition according to claim 6, wherein said polyisocyanate is at least one species selected from the group consisting of aliphatic diisocyanate, alicyclic diisocyanate, and aromatic diisocyanate.

11. A polyurethane composition according to claim 6, wherein said polyisocyanate is at least one species selected from the group consisting of tolylene-2,4-diisocyanate, tolylene-2,6-diisocyanate, 1,5-naphthalene diisocyanate, diphenyl-4,4'-diisocyanate, 3,3-dimethyl biphenyl-4,4'-diisocyanate, diphenyl-methane-4,4'-diisocyanate, hexane diisocyanate, cyclohexyl-1,3-and -1,4-diisocyanate, methylene bis(4-cyclohexyl isocyanate), 1,3-and 1,4-xylene diisocyanate, 1-methylcyclohexane-2,4-diisocyanate, decaline-1,5-diisocyanate, tolaidine diisocyanate and their mixtures.

12. A polyurethane composition according to claim 1, wherein the number average molecular weight of the prepolymer ranges from 1,500 to 4,000.

13. A polyurethane composition according to claim 1, wherein the curative is selected from the group consisting of polyamines and polyols.

14. A polyurethane composition according to claim 1, wherein the curative is a compound selected from the group consisting of aromatic polyamines and aromatic polyols.

15. A method of producing a polyurethane composition according to claim 1, which method comprises mixing homogeneously 100 parts by weight of prepolymer having terminal isocyanate groups, 20 to 50 parts by weight of finely divided silica particles having pH values of from 3 to 7 and appropriate parts of curative, and kneading the mixture under strong shearing force.

16. An article of manufacture comprising a polyurethane composition of claim 1, which is produced by casting and curing the composition of claim 1 in a mould.

* * * * *

UNITED STATES PATENT AND TRADEMARK OFFICE
CERTIFICATE OF CORRECTION

PATENT NO. : 4,062,825
DATED : December 13, 1977
INVENTOR(S) : YOJI WATABE ET AL It is certified that error appears in the above-identified patent and that said Letters Patent are hereby corrected as shown below:

Column 1, line 34, delete first comma.

Column 2, line 37, delete "polymers".

Column 3, line 14, change "butane" to --butene--.

Column 5, line 22, delete "-$CH_3$"; line 43, change " -iso-$C_4H_9$' " to -- -iso-$C_4H_9$, --.

Column 6, line 54, change "50 µ" to --50 mµ--; line 58-59, after "particles" add an apostrophe.

Column 8, line 3, change "µ" to --ρ--; line 9, correct the spelling of "unincorporated"; line 18, before "tester" insert --tensile--; line 23, insert --Γ-- within the parentheses "( )"; line 24, after "and" insert --Γ--; line 30, correct the spelling of "checks" and change "positionedat" to --positioned at--; line 45, after "lining" insert --for-- and after "cover" insert --for--.

Column 10, line 16, change "(1/c)" to --(1/d)--; line 25, after "maximum" insert --value--; Table 1, in heading of columns, change "$\frac{m\Delta}{(1/cm)}$" to --$\frac{m\gamma}{(1/cm)}$--.

UNITED STATES PATENT AND TRADEMARK OFFICE
CERTIFICATE OF CORRECTION

PATENT NO. : 4,062,825

DATED : December 13, 1977

INVENTOR(S) : YOJI WATABE ET AL

It is certified that error appears in the above-identified patent and that said Letters Patent are hereby corrected as shown below:

Column 11, Table 2, in heading of columns, change "$\frac{m\Delta}{(1/cm)}$" to --$\frac{mY}{(1/cm)}$--.

Column 12, line 29, change "3,3-dimethyl" to --3,3'-dimethyl--; line 36, change "tolaidine" to --toluidine--.

Signed and Sealed this

Eleventh Day of July 1978

[SEAL]

Attest:

RUTH C. MASON
*Attesting Officer*

DONALD W. BANNER
*Commissioner of Patents and Trademarks*